(12) United States Patent
Marcos Pastor et al.

(10) Patent No.: US 11,557,978 B2
(45) Date of Patent: Jan. 17, 2023

(54) CONVERTER MODULE WITH PHASE SHIFT

(71) Applicant: LEAR CORPORATION, Southfield, MI (US)

(72) Inventors: Adria Marcos Pastor, Valls (ES); Victor Saborido Rodriguez, Valls (ES); Antonio Martinez Perez, Valls (ES); Josep Maria Bosque Moncusi, Valls (ES); Luis Roda Cornejo, Valls (ES)

(73) Assignee: Lear Corporation, Southfield, MI (US)

( * ) Notice: Subject to any disclaimer, the term of this patent is extended or adjusted under 35 U.S.C. 154(b) by 12 days.

(21) Appl. No.: 17/381,286

(22) Filed: Jul. 21, 2021

(65) Prior Publication Data

US 2022/0038018 A1 Feb. 3, 2022

Related U.S. Application Data (60) Provisional application No. 63/059,400, filed on Jul. 31, 2020.

(51) Int. Cl.
| | |
|---|---|
| *H02M 3/156* | (2006.01) |
| *H02M 3/155* | (2006.01) |
| *H02M 3/335* | (2006.01) |
| *H02M 1/08* | (2006.01) |
| *B60L 53/20* | (2019.01) |
| *H02M 1/36* | (2007.01) |
| *H02M 1/00* | (2006.01) |

(Continued)

(52) U.S. Cl.
CPC ......... *H02M 3/33592* (2013.01); *B60L 53/20* (2019.02); *H02M 1/007* (2021.05); *H02M 1/08* (2013.01); *H02M 1/346* (2021.05); *H02M 1/36* (2013.01); *H02M 3/01* (2021.05); *H02M 3/155* (2013.01); *H02M 3/156* (2013.01)

(58) Field of Classification Search
CPC ......... H02M 3/01; H02M 3/155; H02M 3/156
See application file for complete search history.

(56) References Cited

U.S. PATENT DOCUMENTS

| | | | |
|---|---|---|---|
| 6,836,414 | B1 | 12/2004 | Batarseh et al. |
| 7,768,800 | B2 | 8/2010 | Mazumder et al. |

(Continued)

FOREIGN PATENT DOCUMENTS

JP 5893089 B2 3/2016

*Primary Examiner* — Gary A Nash
(74) *Attorney, Agent, or Firm* — Brooks Kushman P.C.

(57) ABSTRACT

A converter module is provided with a first power delivery circuit, a second power delivery circuit, and a controller. The first power delivery circuit supplies current from a first direct current (DC) source to a resonant stage in a first direction. The first power delivery circuit comprises at least two first switches. The second power delivery circuit supplies the current from the first DC source to the resonant stage in a second direction, opposite the first direction. The controller includes memory, and a processor that is programmed to: enable the first power delivery circuit and the second power delivery circuit alternately to provide power as a periodic waveform to the resonant stage; and disable the at least two first switches individually in a sequence to generate a phase shift in the periodic waveform and to disable the first power delivery circuit.

20 Claims, 7 Drawing Sheets

(51) Int. Cl.
*H02M 1/34* (2007.01)
*H02M 3/00* (2006.01)

(56) References Cited

U.S. PATENT DOCUMENTS

| | | | |
|---|---|---|---|
| 8,669,744 B1* | 3/2014 | Vinciarelli | H02M 3/1582 |
| | | | 323/235 |
| 9,356,523 B2* | 5/2016 | Yoshida | H02M 3/33584 |
| 9,479,082 B2* | 10/2016 | Fornage | H02M 1/4241 |
| 9,509,225 B2 | 11/2016 | Stephens et al. | |
| 9,866,135 B2* | 1/2018 | Kusama | H02M 7/4807 |
| 9,960,687 B2 | 5/2018 | Elasser et al. | |
| 2009/0046482 A1* | 2/2009 | Smith | H02M 3/33573 |
| | | | 363/17 |
| 2014/0268898 A1* | 9/2014 | Zimmanck | H02M 3/33573 |
| | | | 363/17 |
| 2019/0036441 A1* | 1/2019 | Eggers | H02M 3/33507 |
| 2020/0099309 A1 | 3/2020 | Jin et al. | |
| 2020/0136514 A1 | 4/2020 | Masich et al. | |

* cited by examiner

CONVERTER MODULE WITH PHASE SHIFT

CROSS-REFERENCE TO RELATED APPLICATIONS

This application claims the benefit of U.S. provisional application Ser. No. 63/059,400 filed Jul. 31, 2020, the disclosure of which is hereby incorporated in its entirety by reference herein.

TECHNICAL FIELD

One or more embodiments relate to a vehicle converter module for generating a phase shifted square waveform.

BACKGROUND

Electrified vehicles, including pure electric vehicles and hybrid electric vehicles, include a high-voltage battery pack that is used for propulsion or "traction" of the vehicle, and may be referred to as a traction battery. Such electrified vehicles include converter modules for converting power supplied to and from the traction battery. A direct current to direct current (DC/DC) converter module converts an input DC voltage to an output DC voltage. The converter includes a circuit that receives an input DC voltage, and a controller that controls switches of the circuit to open/close at intervals over successive switching periods to generate a waveform that is filtered, scaled, and rectified to provide an output DC voltage, that may be different from the input voltage. Such switches generate electromagnetic energy that may affect other systems and components. Electromagnetic compatibility (EMC) refers to the ability of electrical equipment and systems to function acceptably in their electromagnetic environment, by limiting the unintentional generation, propagation and reception of electromagnetic energy which may cause unwanted effects such as electromagnetic interference (EMI) in operational equipment.

SUMMARY

In one embodiment, a converter module is provided with a first power delivery circuit, a second power delivery circuit, and a controller. The first power delivery circuit supplies current from a first direct current (DC) source to a resonant stage in a first direction. The first power delivery circuit comprises at least two first switches. The second power delivery circuit supplies the current from the first DC source to the resonant stage in a second direction, opposite the first direction. The controller includes memory, and a processor that is programmed to: enable the first power delivery circuit and the second power delivery circuit alternately to provide power as a periodic waveform to the resonant stage; and disable the at least two first switches individually in a sequence to generate a phase shift in the periodic waveform and to disable the first power delivery circuit.

In another embodiment, a converter module is provided with a first power delivery circuit to supply positive direct current (DC) voltage from a first DC source to a resonant stage. The first power delivery circuit comprises at least two first switches. A second power delivery circuit supplies negative DC voltage to the resonant stage. The second power delivery circuit comprises at least two second switches. A controller including memory, and a processor that is programmed to: enable the first power delivery circuit and the second power delivery circuit alternately to provide power as a periodic waveform to the resonant stage; and disable the at least two first switches individually in a sequence to generate a falling phase shift in the periodic waveform and to disable the first power delivery circuit.

In yet another embodiment, a method for generating a periodic waveform with a phase-shift is provided. A first power delivery circuit, coupled between a direct current (DC) source and a resonant stage, is disabled from supplying positive voltage to the resonant stage. A second power delivery circuit is enabled to supply negative voltage to the resonant stage. A first switch of the second power delivery circuit is disabled. After a predetermined period of time, a second switch of the second power delivery circuit is disabled, to generate a substantially constant voltage segment between two rising edge portions of the periodic waveform.

In one embodiment a converter module is provided with a switching circuit to receive a direct current (DC) input from an electrical bus and convert the DC input to a square waveform. The switching circuit comprises a first switch and a fourth switch to connect in series with a resonant filter to provide a positive power delivery path, and a second switch and a third switch to connect in series with the resonant filter to provide a negative power delivery path. The controller includes memory and a processor programmed to: disable the second switch and the third switch in a sequence to generate a phase shifted rising edge of the square waveform; and disable the first switch and the fourth switch in a sequence to generate a phase shifted falling edge of the square waveform.

Another embodiment provides a converter module comprising a switching circuit to receive a direct current (DC) input and convert the DC input to a square waveform. The switching circuit comprises a first switch and a fourth switch to connect in series with a load to provide a positive power delivery path and a second switch and a third switch to connect in series with the load to provide a negative power delivery path. The converter also comprises a controller including memory and a processor programmed to: disable the second switch and the third switch in a sequence to generate a rising edge of the square waveform with a substantially flat voltage segment interposed therein; and disable the first switch and the fourth switch in a sequence to generate a falling edge of the square waveform with a substantially flat voltage segment interposed therein.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
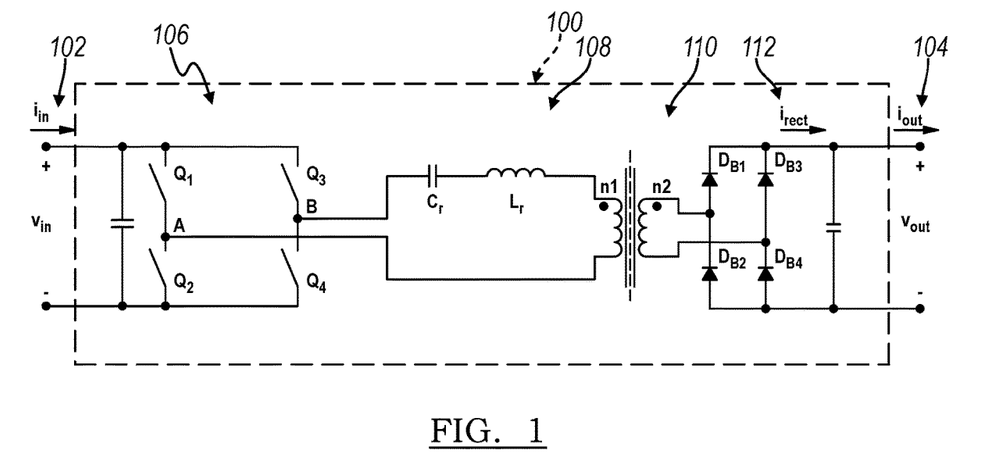
FIG. 1 is a schematic diagram of a converter module, according to one or more embodiments.

With reference to FIG. 1, a converter is illustrated in accordance with one or more embodiments and generally represented by numeral 100. The converter 100 is a module that is connected between a first DC bus 102 and a second DC bus 104 and converts and conditions the electrical power transferred between the buses. In one or more embodiments, the first DC bus 102 is a high-voltage (HV) DC bus that is connected to a high-voltage DC power source (not shown), such as a 300-400 volt traction battery, and the second DC bus 104 is a low-voltage DC bus that is connected to a low-voltage DC power source (not shown), such as a 12 volt battery. In another embodiment, the first DC bus 102 represents a HVDC bus which is supplied from a Power Factor Correction stage of the converter 100, and the second DC bus 104 represents the 300-400 volt traction battery. The converter 100 includes a switching circuit 106, a resonant stage 108, a transformer 110, and a rectifier 112.

The switching circuit 106 receives a DC input voltage from the HV DC bus 102 and converts the DC voltage to a load voltage having a periodic waveform, such as a square waveform. The switching circuit 106 includes four switches: $Q_1$, $Q_2$, $Q_3$, and $Q_4$, that are controlled in pairs to generate the square waveform. The first switch ($Q_1$) and the fourth switch ($Q_4$) provide a first power delivery circuit 107 (shown in FIGS. 4C and 7E) to excite the resonant stage 108 with a positive voltage. The second switch ($Q_2$) and the third switch ($Q_3$) provide a second power delivery circuit 109 (shown in FIGS. 4A and 7A) to excite the resonant stage 108 with a negative voltage. Such switches generate electromagnetic energy that may affect other systems and components. The switching circuit 106 is controlled to shift the phase of the square waveform to reduce this electromagnetic energy.

The resonant stage 108 includes a resonant inductor ($L_r$), a resonant capacitor ($C_r$) and a winding of the transformer 110 to form an LLC resonant stage that is connected in series with the switching circuit 106, according to one or more embodiments. The resonant stage 108 converts the square waveform to alternating current (AC). The transformer 110 scales, e.g., increases or decreases, the amplitude of the AC signal. The rectifier 112 converts the AC back to DC. The converter 100 also includes an input filter and an output filter for filtering the input and output signals, respectively. The converter 100 may step-down or step-up the voltage. The converter 100 acts as a step-down converter by reducing high input voltage (e.g., 300-400 volts) to low output voltage (e.g., 12 volts). The converter 100 may also acts as a step-up converter by increasing a voltage input (e.g., a voltage of approximately 400 V supplied from a Power factor correction stage) to a higher voltage output (e.g., 500 V to supply an HV battery). In one or more embodiments, the converter 100 functions as a bi-directional step-down/step-up converter and converts the DC voltage in both directions between the HV DC bus 102 and the LV DC bus 104.

Figure 2:
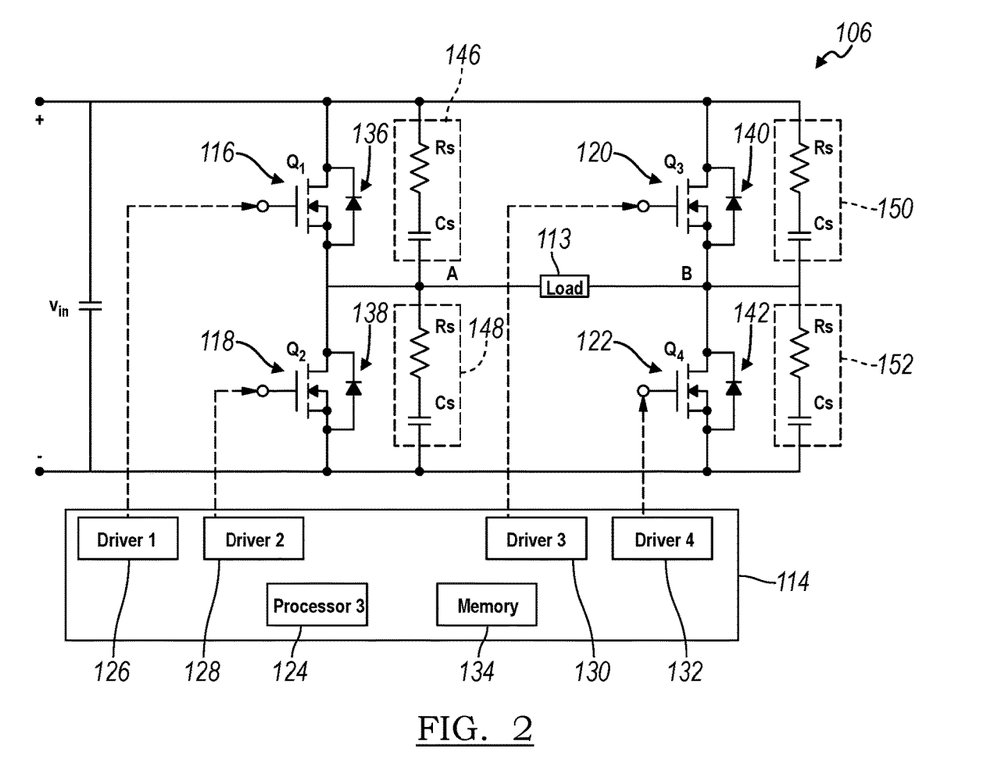
FIG. 2 is a circuit diagram illustrating a switching circuit of the converter module of FIG. 1.

FIG. 2 illustrates a simplified diagram of the switching circuit 106 of the converter 100 in which the resonant stage 108, together with the LV DC bus 104, the transformer 110, and the rectifier 112, is represented by a single "Load" element 113. The converter 100 includes a controller 114 for controlling the switching circuit 106. The switching circuit 106 includes four switches, including a first switch 116, a second switch 118, a third switch 120, and a fourth switch 122. The switches 116, 118, 120, 122 are metal-oxide-semiconductor field-effect transistors (MOSFETs) that are arranged in a full H-bridge configuration according to one or more embodiments. A MOSFET is a three-terminal semiconductor device that includes a source (S), a gate (G), and a drain (D).

The controller 114 includes a processor 124 and four drivers, including a first driver 126, a second driver 128, a third driver 130, and a fourth driver 132, for controlling the four switches according to one or more embodiments. The controller 114 controls the switches to open/close to form the square waveform load voltage according to a predetermined switching cycle that is stored in memory 134, according to one or more embodiments. The MOSFETs include four body diodes, including a first diode 136, a second diode 138, a third diode 140, and a fourth diode 142 that are connected in parallel with the first switch 116, the second switch 118, the third switch 120, and the fourth switch 122, respectively. The diodes 136, 138, 140, and 142 provide a path for current to bypass the corresponding parallel switch 116, 118, 120, and 122 when it is open.

The switching circuit 106 includes snubber circuits to reduce electromagnetic interference (EMI). When each switch 116, 118, 120, 122 is opened, its drain current decreases rapidly which causes the voltage potential between the drain and the source (Vds) to increase sharply due to stray inductances. This transient voltage oscillates before settling, which may cause electromagnetic interference (EMI) in other devices. The switching circuit 106 includes a first snubber circuit 146, a second snubber circuit 148, a third snubber circuit 150, and a fourth snubber circuit 152, that are arranged in parallel with the first diode 136, the second diode 138, the third diode 140, and the fourth diode 142 respectively to damp the transient voltage present on Vds during a switch-off condition. The snubber circuits may include one or more resistors (R), capacitors (C), and diodes (D). The illustrated embodiment includes RC snubber circuits that each include a resistor and capacitor that are connected, together in parallel, with each body diode 136, 138, 140, 142. In other embodiments the switching circuit 106 may include other snubber circuit configurations, such as a diode (D) snubber circuit or a resistor, capacitor, diode (RCD) snubber circuit (not shown).

Figure 3:
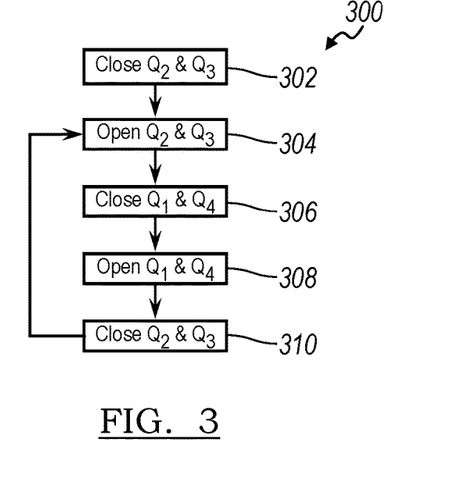
FIG. 3 is a flow chart illustrating a method for controlling the switching circuit of FIG. 2.
Figure 4A:
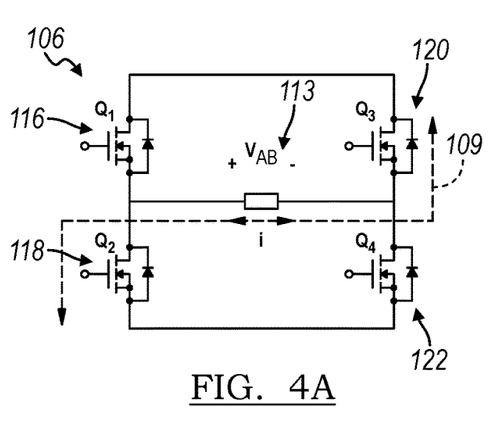
FIG. 4A is a simplified circuit diagram of the switching circuit of FIG. 2 in a first configuration, illustrating the method for controlling the switching circuit of FIG. 3.
Figure 4B:
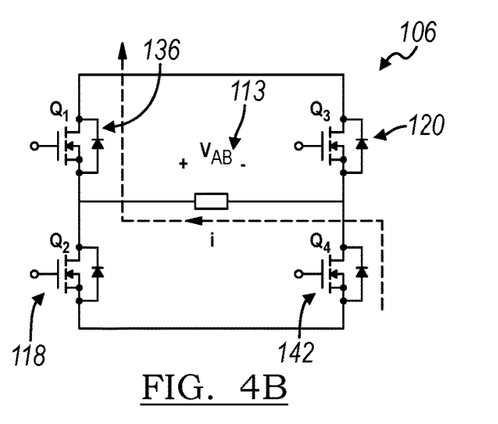
FIG. 4B is a simplified circuit diagram of the switching circuit of FIG. 2 in a second configuration, further illustrating the method for controlling the switching circuit of FIG. 3.
Figure 4C:
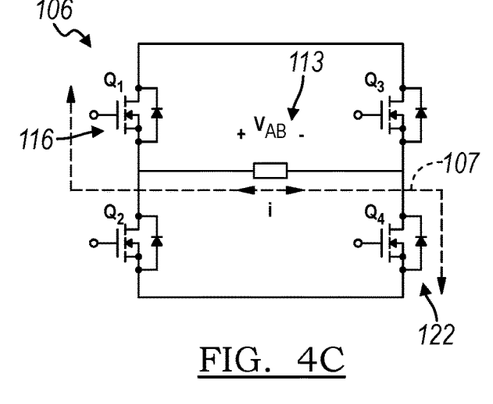
FIG. 4C is a simplified circuit diagram of the switching circuit of FIG. 2 in a third configuration, further illustrating the method for controlling the switching circuit of FIG. 3.
Figure 4D:
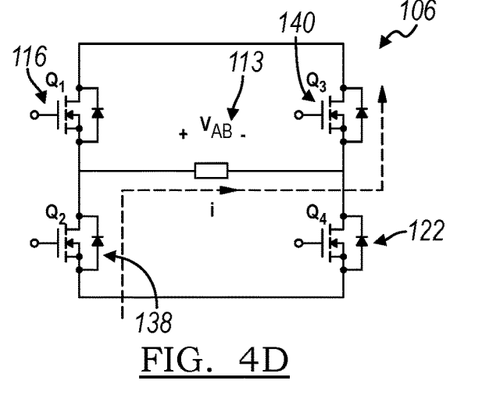
FIG. 4D is a simplified circuit diagram of the switching circuit of FIG. 2 in a fourth configuration, further illustrating the method for controlling the switching circuit of FIG. 3.
Figure 5:
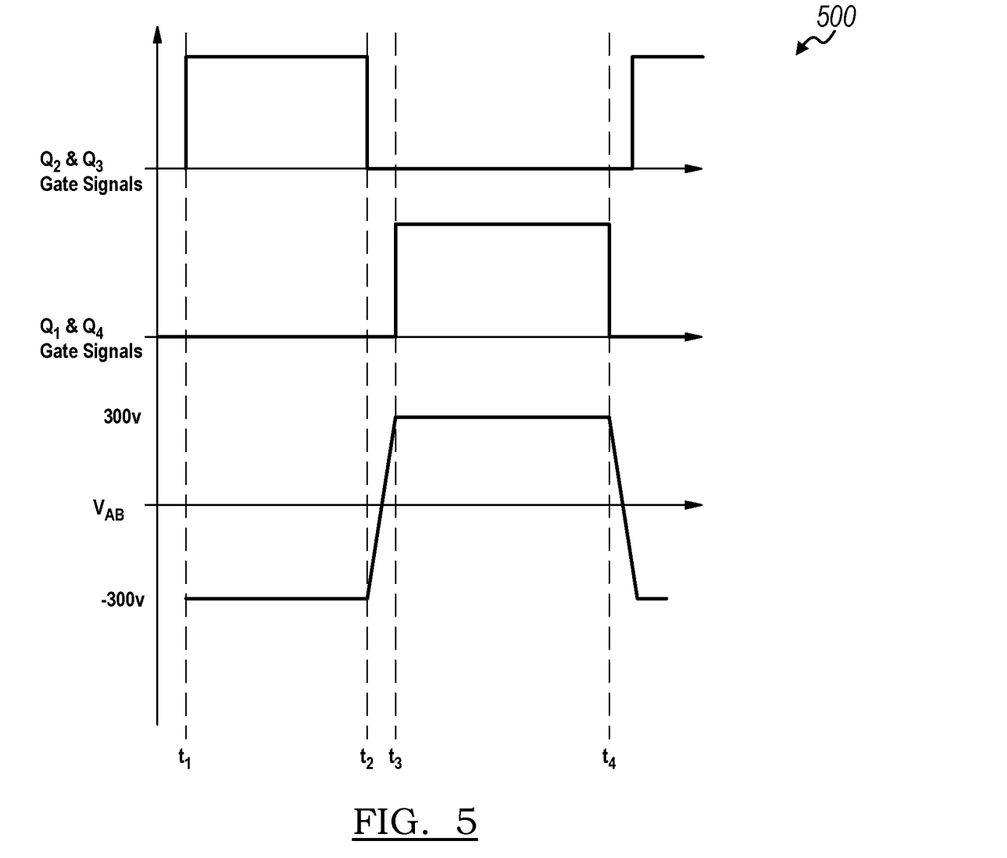
FIG. 5 is a diagram illustrating a gating sequence according to the method of FIG. 3.

Referring to FIGS. 3-5, the controller 114 controls the switching circuit 106 to generate a load voltage ($V_{AB}$) with a square waveform, according to one or more embodiments. With reference to FIG. 3, a method for controlling the switching circuit 106 is illustrated in accordance with one or more embodiments and generally referenced by numeral 300. The method is implemented using software code contained within the controller 114 according to one or more embodiments. The controller 114 generally includes any number of processors 124, microprocessors, ASICs, ICs, memory 134 (e.g., FLASH, ROM, RAM, EPROM and/or EEPROM) and software code to co-act with one another to perform a series of operations. The controller 114 also includes predetermined data, or "look up tables" that are stored within the memory 134, according to one or more embodiments. While the method is described using a flowchart that is illustrated with a number of sequential steps, one or more steps may be omitted and/or executed in another manner in one or more other embodiments. At step 302, the controller 114 closes, or turns on, the second switch ($Q_2$) 118 and the third switch ($Q_3$) 120.

FIG. 4A illustrates a first configuration of the switching circuit 106 after step 302 in which the first switch 116 and the fourth switch 122 are open, and the second switch 118 and the third switch 120 are closed. During this configuration, the current changes its direction through switching circuit 106. Initially, current flows from left to right through the resonant load 113, and afterwards from right to left through the second power deliver circuit 109, as illustrated by a dashed line in FIG. 4A, to excite the resonant load 113 with a negative voltage.

FIG. 5 is a graph 500 of the gate signals that the first driver 126, the second driver 128, the third driver 130, and the fourth driver 132 provide to the first switch 116 ($Q_1$), the second switch 118 ($Q_2$), the third switch 120 ($Q_3$), and the fourth switch 122 ($Q_4$), respectively. The graph 500 also includes the load voltage ($V_{AB}$) measured during the sequence. As illustrated at time $t_1$, the load voltage ($V_{AB}$) is approximately equal to the negative HV bus voltage of −300 V when the switching circuit 106 is arranged in the first configuration.

Referring to FIG. 3, at step 304 the controller 114 opens the second switch ($Q_2$) 118 and the third switch ($Q_3$) 120. FIG. 4B illustrates a second configuration of the switching circuit 106 after step 304 in which all switches are open to avoid switches that are arranged on different power delivery circuits (e.g., $Q_1$ and $Q_2$ or $Q_3$ and $Q_4$) from being closed at the same time, which would cause a short circuit. The current continues flowing through the resonant load 113 from right to left, and now the current flows through the first diode 136 and the fourth diode 142, as illustrated by the dashed line in FIG. 4B. As illustrated after time $t_2$ in FIG. 5, the second configuration causes $V_{AB}$ to increase rapidly to the positive HV bus voltage of 300 V.

Referring to FIG. 3, at step 306, the controller 114 closes the first switch ($Q_1$) 116 and the fourth switch ($Q_4$) 122. FIG. 4C illustrates a third configuration of the switching circuit 106 after step 306 in which the first switch 116 and the fourth switch 122 are closed, and the second switch 118 and the third switch 120 are open. During this configuration, the current changes its direction through switching circuit 106. Initially, current flows from right to left through the resonant load 113, and afterwards from left to right through the first power deliver circuit 107 to excite the resonant load 113 with a positive voltage, as illustrated by the dashed line in FIG. 4C. As illustrated after time $t_3$ in FIG. 5, the third configuration causes $V_{AB}$ to remain at the positive HV bus voltage of 300 V.

Referring to FIG. 3, at step 308 the controller 114 opens the first switch ($Q_1$) 116 and the fourth switch ($Q_4$) 122. FIG. 4D illustrates a fourth configuration of the switching circuit 106 after step 308 in which all switches are open. The current continues flowing through the resonant load 113 from left to right, and now the current flows through the second diode 138 and the third diode 140, as illustrated by the dashed line in FIG. 4D. As illustrated after time $t_4$ in FIG. 5, the fourth configuration causes $V_{AB}$ to decrease rapidly to the negative HV bus voltage of −300 V.

Figure 6:
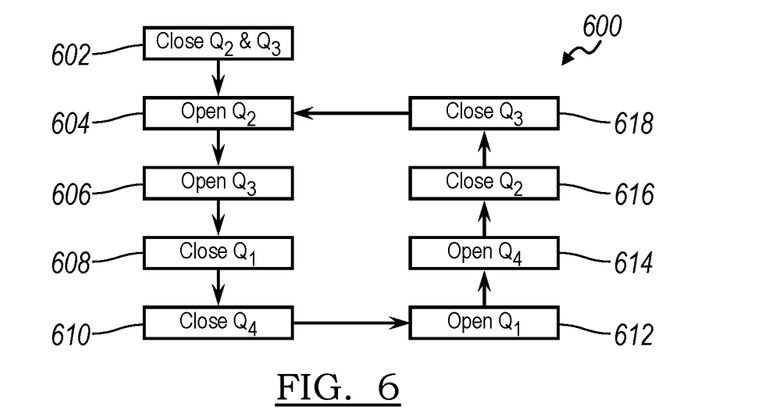
FIG. 6 is a flow chart illustrating another method for controlling the switching circuit of FIG. 2.
Figure 7A:
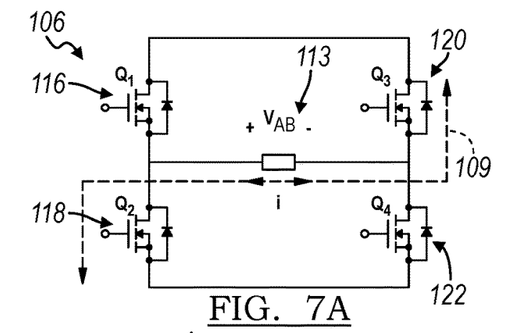
FIG. 7A is a simplified circuit diagram of the switching circuit of FIG. 2 in a first configuration, illustrating the method for controlling the switching circuit of FIG. 6.
Figure 8:
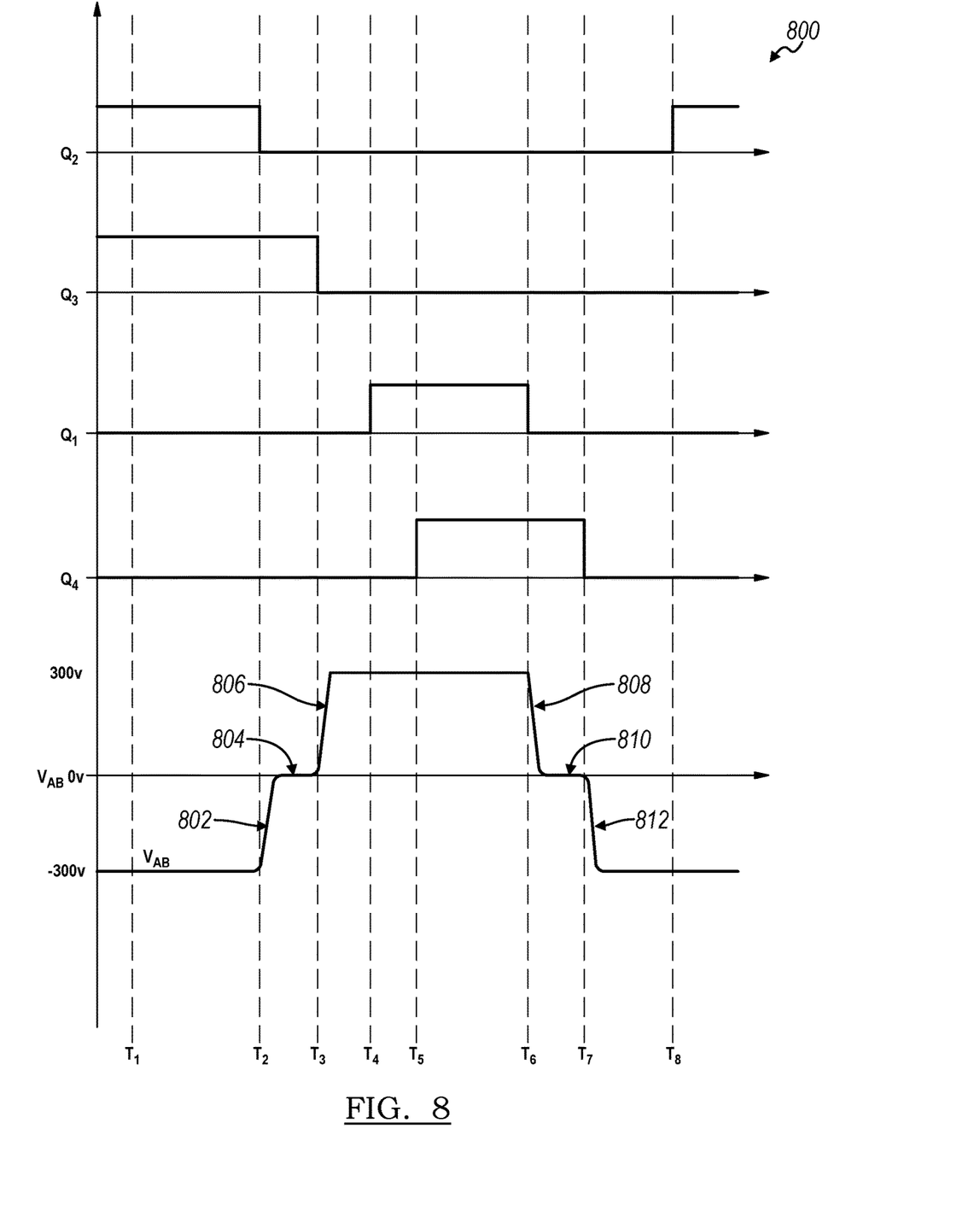
FIG. 8 is a diagram illustrating a gating sequence according to the method of FIG. 6.

Referring to FIGS. 6-8, the controller 114 controls the switching circuit 106 to generate a square waveform with phase-shifted rising and falling edges according to one or more embodiments. With reference to FIG. 6, a method for controlling the switching circuit 106 to generate a phase-shifted square waveform is illustrated in accordance with one or more embodiments and generally referenced by numeral 600. The method is implemented using software code contained with the controller 114 according to one or more embodiments. The controller 114 generally includes any number of processors 124, microprocessors, ASICs, ICs, memory 134 (e.g., FLASH, ROM, RAM, EPROM and/or EEPROM) and software code to co-act with one another to perform a series of operations. The controller 114 also includes predetermined data, or "look up tables" that are stored within the memory 134, according to one or more embodiments. While the method is described using a flowchart that is illustrated with a number of sequential steps, one or more steps may be omitted and/or executed in another manner in one or more other embodiments. At step 602, the controller 114 closes, or turns on, the second switch ($Q_2$) 118 and the third switch ($Q_3$) 120.

FIG. 7A illustrates a first configuration of the switching circuit 106 after step 602 in which the first switch 116 and the fourth switch 122 are open, and the second switch 118 and the third switch 120 are closed. This first configuration results in current flowing through the resonant load 113 from left to right initially, then afterwards right to left through the second power deliver circuit 109, as illustrated by a dashed line in FIG. 7A to excite the resonant load 113 with a negative voltage.

FIG. 8 is a graph 800 of the gate signals that the first driver 126, the second driver 128, the third driver 130, and the fourth driver 132 provide to the first switch 116 ($Q_1$), the second switch 118 ($Q_2$), the third switch 120 ($Q_3$), and the fourth switch 122 ($Q_4$) according to the method 600 of FIG. 6. The graph 800 also includes the load voltage ($V_{AB}$) measured during the sequence. As illustrated at time $T_1$, the load voltage ($V_{AB}$) is approximately equal to the negative HV bus voltage of −300 V when the switching circuit 106 is arranged in the first configuration.

Figure 7B:
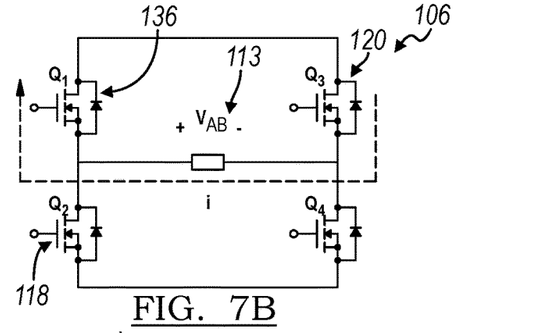
FIG. 7B is a simplified circuit diagram of the switching circuit of FIG. 2 in a second configuration, further illustrating the method for controlling the switching circuit of FIG. 6.

Referring to FIG. 6, at step 604 the controller 114 opens the second switch ($Q_2$) 118. FIG. 7B illustrates a second configuration of the switching circuit 106 after step 604 in which the third switch 120 is closed, and the remaining switches are open. The current flows through the third switch 120, the resonant load 113 right to left, and the first diode 136 as illustrated by a dashed line in FIG. 7B to provide zero voltage potential. As illustrated after time $T_2$ in FIG. 8, the second configuration causes $V_{AB}$ to increase rapidly to zero voltage.

Figure 7C:
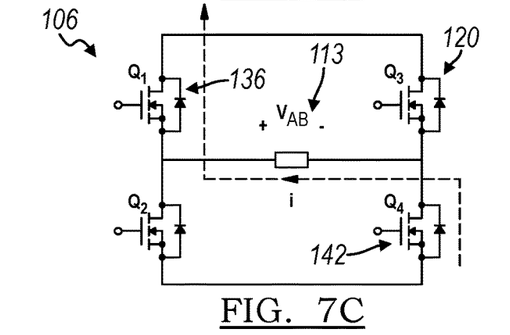
FIG. 7C is a simplified circuit diagram of the switching circuit of FIG. 2 in a third configuration, further illustrating the method for controlling the switching circuit of FIG. 6.

Referring to FIG. 6, at step 606 the controller 114 opens the third switch ($Q_3$) 120. FIG. 7C illustrates a third configuration of the switching circuit 106 after step 606 in which all switches are off (open). The current continues flowing right to left through the resonant load 113, and now the current flows through the first diode 136 and the fourth diode 142, as illustrated by the dashed line in FIG. 7C. As illustrated after time $T_3$ in FIG. 8, the third configuration causes $V_{AB}$ to increase rapidly to the positive HV bus voltage of 300 V.

Figure 7D:
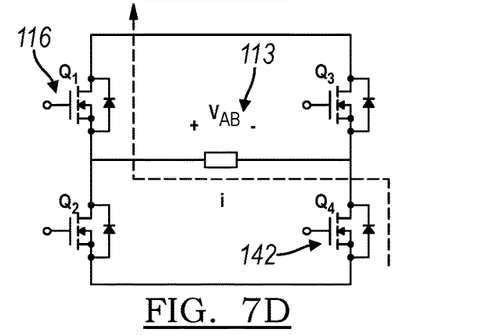
FIG. 7D is a simplified circuit diagram of the switching circuit of FIG. 2 in a fourth configuration, further illustrating the method for controlling the switching circuit of FIG. 6.

Referring to FIG. 6, at step 608 the controller 114 closes the first switch ($Q_1$) 116. FIG. 7D illustrates a fourth configuration of the switching circuit 106 after step 608 in which the first switch 116 is closed, and all other switches are off (open). The current continues flowing right to left through the fourth diode 142, the resonant load 113 and the first switch 116, as illustrated by a dashed line in FIG. 7D. As illustrated after time $T_4$ in FIG. 8, the fourth configuration causes $V_{AB}$ to maintain the positive HV bus voltage of 300 V.

As illustrated in FIGS. 7A-7C, the controller 114 disables, or opens, the second switch 118 and the third switch 120 individually in a sequence. Referring to FIG. 8, this individual control of the switches results in a phase shifted rising edge of the square waveform illustrated between time $T_2$ and time $T_4$, with a first rising edge portion 802 after $T_2$, a first deadtime 804, or substantially constant voltage, between $T_2$ and $T_3$, and a second rising edge portion 806 after $T_3$. The first and second rising edge portions 802, 806 are transient conditions that occur over a shorter time period than the deadtime 804. In one embodiment, the first and second rising edge portions 802, 806 each occur over approximately 15 ns, and the first deadtime 804 is approximately 350 ns.

Figure 7E:
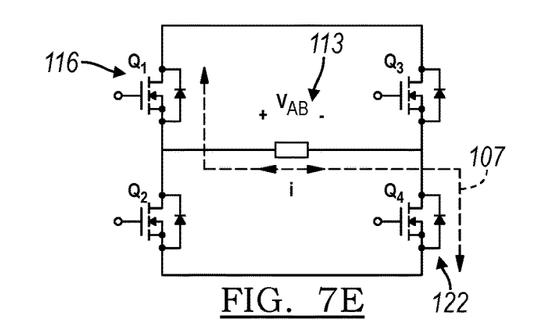
FIG. 7E is a simplified circuit diagram of the switching circuit of FIG. 2 in a fifth configuration, further illustrating the method for controlling the switching circuit of FIG. 6.

Referring to FIG. 6, at step 610 the controller 114 closes the fourth switch ($Q_4$) 122. FIG. 7E illustrates a fifth configuration of the switching circuit 106 after step 610 in which the first switch 116 and the fourth switch 122 are closed, and the second switch 118 and the third switch 120 are open. The fifth configuration results in current flowing right to left through the resonant load 113 initially, then afterwards left to right through the first power deliver circuit 107, to excite the resonant load 113 with a positive voltage as illustrated by the dashed line in FIG. 7E. As illustrated after time $T_5$ in FIG. 8, the fifth configuration causes $V_{AB}$ to remain at the positive HV bus voltage of 300 V.

Figure 7F:
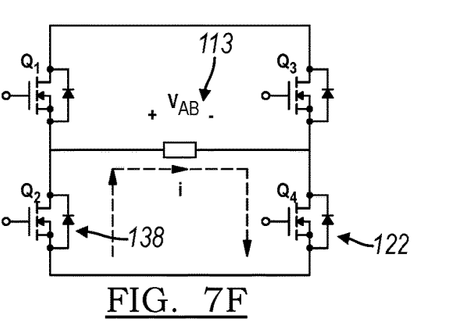
FIG. 7F is a simplified circuit diagram of the switching circuit of FIG. 2 in a sixth configuration, further illustrating the method for controlling the switching circuit of FIG. 6.

Referring to FIG. 6, at step 612 the controller 114 opens the first switch ($Q_1$) 116. FIG. 7F illustrates a sixth configuration of the switching circuit 106 after step 612 in which the fourth switch 122 is closed, and all other switches are off (open). The current flows through the second diode 138, the resonant load 113, and the fourth switch 122, as illustrated by the dashed line in FIG. 7F. As illustrated after time $T_6$ in FIG. 8, the sixth configuration causes $V_{AB}$ to decrease rapidly to zero volts.

Figure 7G:
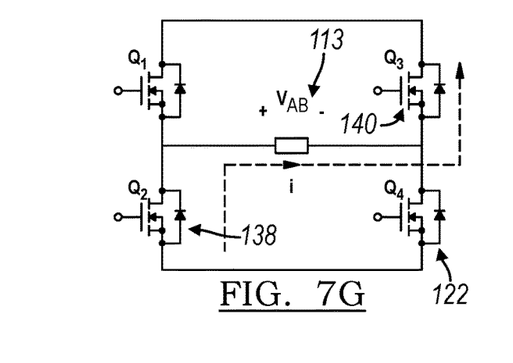
FIG. 7G is a simplified circuit diagram of the switching circuit of FIG. 2 in a seventh configuration, further illustrating the method for controlling the switching circuit of FIG. 6.

Referring to FIG. 6, at step 614 the controller 114 opens the fourth switch ($Q_4$) 122. FIG. 7G illustrates a seventh configuration after step 614 in which all switches are open. The current continues flowing left to right through the resonant load 113 and now the current flows through the second diode 138 and the third diode 140, as illustrated by the dashed line in FIG. 7G. As illustrated after time $T_7$ in FIG. 8, the seventh configuration causes $V_{AB}$ to decrease rapidly to the negative HV bus voltage of −300 V.

As illustrated in FIGS. 7E-7G, the controller 114 disables, or opens, the first switch 116 and the fourth switch 122 individually in a sequence. Referring to FIG. 8, this individual control of the switches results in a phase shifted falling edge of the square waveform illustrated between time $T_6$ and time $T_8$, with a first falling edge portion 808 after $T_6$, a second deadtime 810, or substantially constant voltage, between $T_6$ and $T_7$, and a second falling edge portion 812 after $T_7$. The first and second falling edge portions 808, 812 are transient conditions that occur over a shorter time period than the second deadtime 810. In one embodiment, the first and second falling edge portions 808, 812 each occur over approximately 15 ns, and the second deadtime is approximately 350 ns.

Figure 7H:
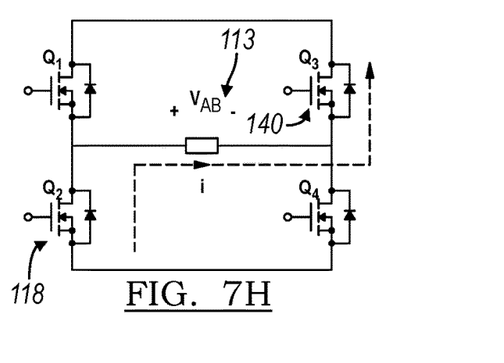
FIG. 7H is a simplified circuit diagram of the switching circuit of FIG. 2 in a eighth configuration, further illustrating the method for controlling the switching circuit of FIG. 6.

Referring to FIG. 6, at step 616 the controller 114 closes the second switch ($Q_2$) 118. FIG. 7H illustrates an eighth configuration of the switching circuit 106 after step 616 in which the second switch 118 is closed and the remaining switches are open. The current flows through the second switch 118, through the resonant load 113 left to right and through the third diode 140, as illustrated by a dashed line in FIG. 7H. As illustrated after time $T_8$ in FIG. 8, the eighth configuration causes $V_{AB}$ to remain at the negative HV bus voltage of −300 V. Referring back to FIG. 6, at step 618 the controller 114 closes the third switch ($Q_3$) 120, and then returns to step 604.

Figure 9:
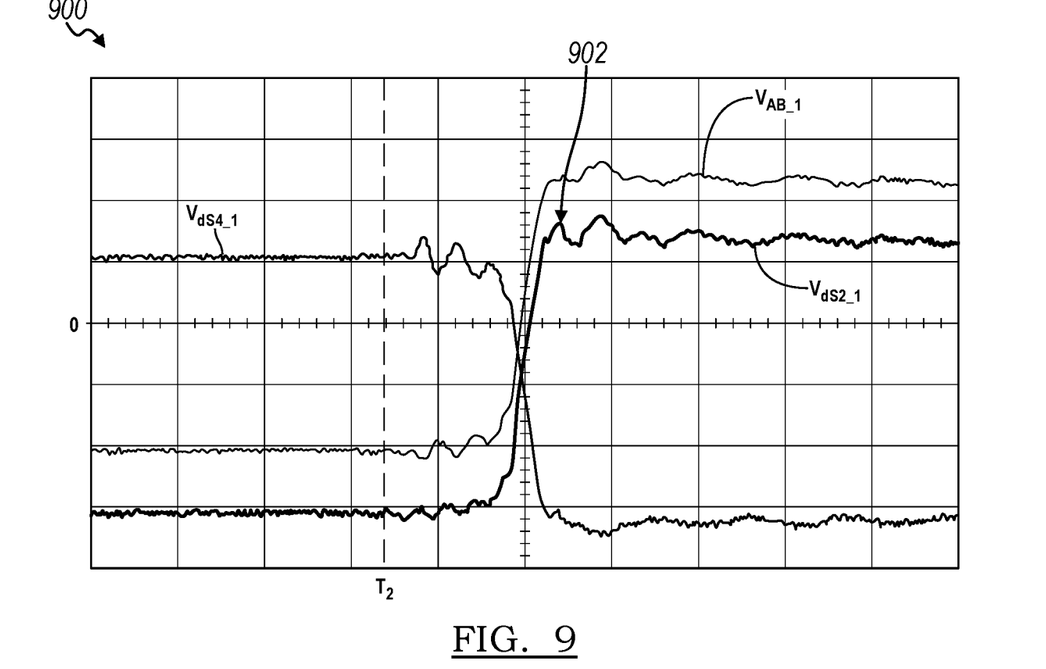
FIG. 9 is a graph of voltage measurements of the switching circuit of FIG. 2 taken during the method of FIG. 3.

FIG. 9 is a graph 900 of voltage measurements (Vds2_1, Vds4_1, and $V_{AB}$_1) of the switching circuit of FIG. 2 taken during the first method 300 of FIG. 3. The graph 900 includes a first curve (Vds2_1) and a second curve (Vds4_1) that represent the voltage potential between the drain (D) and the source (S) of the second switch 118 and the fourth switch 122 after the switches 118, 122 are turned off, e.g., after time $t_2$. The graph 900 also includes a third curve ($V_{AB}$_1) that illustrates the rising edge of the square waveform load voltage generated by the switching circuit 106 after time $t_2$ during the method 300. As shown in FIG. 9, after the second switch 118 is opened, the resultant transient voltage of Vds2_1 overshoots the supply voltage by approximately 55 volts, as referenced by numeral 902.

Figure 10:
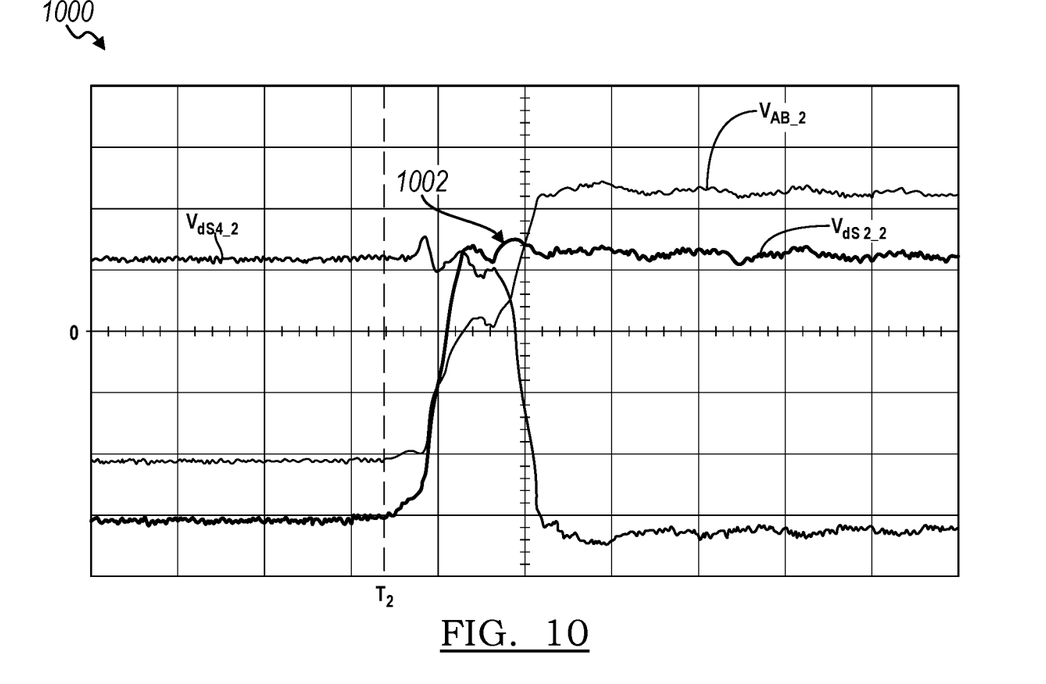
FIG. 10 is a graph of voltage measurements of the switching circuit of FIG. 2 taken during the method of FIG. 6.

FIG. 10 is a graph 1000 of voltage measurements (Vds2_2, Vds4_2, and $V_{AB\_2}$) of the switching circuit of FIG. 2 taken during the second method 600 of FIG. 6. The graph 1000 includes a first curve (Vds2_2) and a second curve (Vds4_2) that represent the voltage potential between the drain (D) and the source (S) of the second switch 118 and the fourth switch 122 after the switches 118, 122 are turned off, e.g., after time $T_2$. The graph 1000 also includes a third curve ($V_{AB\_2}$) that illustrates the rising edge of the phase-shifted square waveform load voltage generated by the switching circuit 106 after time $T_2$ during the method 600. As shown in FIG. 10, after the second switch 118 is opened, the resultant transient voltage of Vds2_2 overshoots the supply voltage of 420 volts by approximately 30 volts to a maximum of 449 volts, as referenced by numeral 1002, which is approximately 25 volts less than the overshoot 902 described above with reference to graph 900 in FIG. 9.

Figure 11:
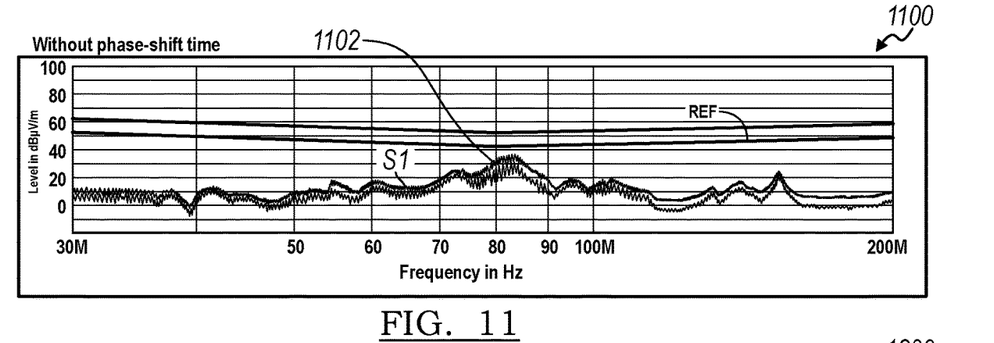
FIG. 11 is a graph of signals measured during an electromagnetic compatibility (EMC) test of the system of FIG. 2 according to the method of FIG. 3.

FIG. 11 is a graph 1100 of signals measured during a radio broadband electromagnetic compatibility (EMC) test of the converter 100 when the switching circuit 106 is controlled according to the first method 300 of FIG. 3. Generally, a system is electromagnetically compatible if it: does not cause interference with other systems; is not susceptible to emissions from other systems; and does not cause interference with itself. The converter 100 is tested in the frequency range of 30 MHz to 200 MHz. The test limits are 40-50 dB (μV/m) as represented by reference curve (REF). The curve (S1) represents the broadband emissions of the converter 100, including the switching circuit 106. As shown in the graph 1100, S1 reaches a maximum of 37.362 dBuV/M at 83.13 MHz, as indicated by numeral 1102.

Figure 12:
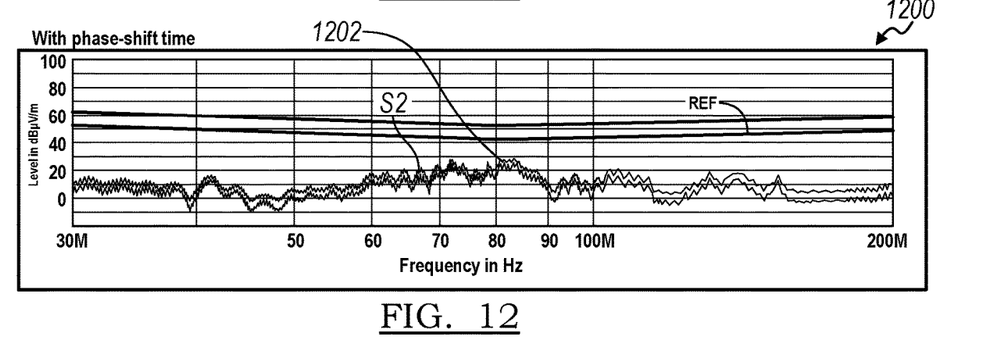
FIG. 12 is a graph of signals measured during an electromagnetic compatibility (EMC) test of the system of FIG. 2 according to the method of FIG. 6.

FIG. 12 is a graph 1200 of signals measured during a radio broadband electromagnetic compatibility (EMC) test of the converter 100 when the switching circuit 106 is controlled according to the second method 600 of FIG. 6. The converter 100 is tested in the frequency range of 30 MHz to 200 MHz, and the test limits are 40-50 dB (μV/m) as represented by reference curve (REF). The curve (S2) represents the broadband emissions of the converter 100, including the switching circuit 106 during the test. As shown in the graph 1200, S2 reaches a maximum of 29.179 dBuV/M at 83.37 MHz, as indicated by numeral 1202, which is 8.183 dBqV/m less than the maximum of S1 in graph 1100 of FIG. 11, which illustrates how the second method 600 for controlling the switching circuit provides EMC improvements over other strategies, such as the first method 300.

Figure 13:
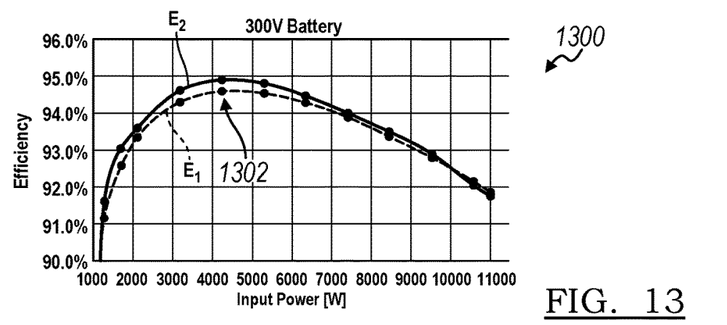
FIG. 13 is a graph illustrating a comparison of the efficiency of the converter system at a first battery voltage of 300 V when the switching circuit is controlled according to the methods of FIG. 3 and FIG. 6.
Figure 14:
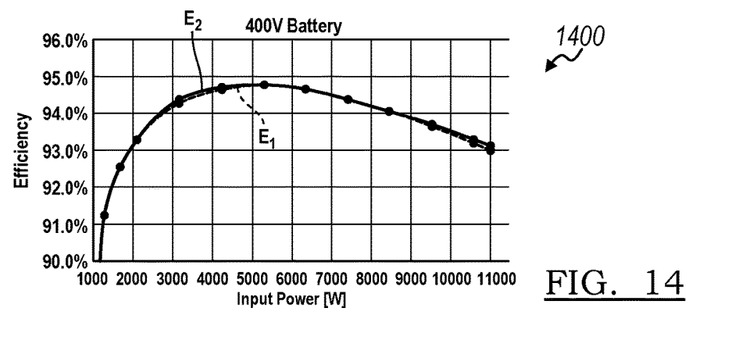
FIG. 14 is a graph illustrating a comparison of the efficiency of the converter system at a first battery voltage of 400 V when the switching circuit is controlled according to the methods of FIG. 3 and FIG. 6.

FIGS. 13-14 are graphs 1300, 1400, illustrating a comparison of the efficiency of the converter 100 when controlling the switching circuit 106 using the first method 300 of FIG. 3 to the second method 600 of FIG. 6. Efficiency may be calculated based on a comparison of the input power (Pin) to the output power (Pout), e.g., E=Pout/Pin. Battery voltage decreases under load, i.e., when current is drawn from the battery. Graph 1300 illustrates efficiency values under high current conditions when the battery voltage has dropped to 300 Volts, and Graph 1400 illustrates efficiency values under low current conditions when the battery voltage is 400 Volts. Electrical components heat up during high current conditions, which results in efficiency losses as illustrated by the higher efficiency values in Graph 1400, as compared to Graph 1300.

The graphs 1300, 1400, include a first curve ($E_1$) illustrating the efficiency of the converter 100 including the switching circuit 106 with snubber circuits 146, 148, 150, 152, when the controller 114 is controlling the switching circuit 106 according to the first method 300 of FIG. 3. The graphs also include a second curve ($E_2$) illustrating the efficiency of the converter 100, when the controller 114 is controlling the switching circuit 106 according to the second method 600 of FIG. 6. Graph 1300 illustrates that $E_2$ is greater than $E_1$ by approximately 0.5%, as referenced by numeral 1302. This illustrates that the second method 600 provides efficiency improvements over the first method 300. The snubber circuits heat up during high-load conditions, which contribute to the efficiency losses. The efficiency improvements of the second method 600 may allow for the selection of lower capacity snubber circuit components, resulting in cost savings.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A converter module comprising:
a first power delivery circuit to supply current from a first direct current (DC) source to a resonant stage in a first direction, the first power delivery circuit comprising at least two first switches;
a second power delivery circuit to supply the current from the first DC source to the resonant stage in a second direction, opposite the first direction; and
a controller including memory, and a processor programmed to:
enable the first power delivery circuit and the second power delivery circuit alternately to provide power as a periodic waveform to the resonant stage; and
disable the at least two first switches individually in a sequence to generate a phase shift in the periodic waveform and to disable the first power delivery circuit.

2. The converter module of claim 1 wherein the phase shift of the periodic waveform comprises a constant voltage segment between two edge portions extending between a maximum voltage and a minimum voltage.

3. The converter module of claim 2 wherein the constant voltage segment is approximately equal to zero volts.

4. The converter module of claim 1, wherein the second power delivery circuit comprises at least two second switches and is adapted to supply a negative voltage to the resonant stage, wherein the controller is further programmed to:
disable the at least two second switches individually to generate a rising phase shift between two rising edge portions of the periodic waveform and to disable the second power delivery circuit.

5. The converter module of claim 1, wherein the first power delivery circuit is adapted to supply a positive voltage to the resonant stage, wherein the controller is further programmed to:
disable the at least two first switches individually to generate a falling phase shift between two falling edge portions of the periodic waveform.

6. The converter module of claim 1 wherein the resonant stage converts the periodic waveform to an alternating current (AC) signal, the converter module further comprising:
a transformer coupled to the resonant stage to adjust an amplitude of the AC signal; and a rectifier coupled between the transformer and a second DC source to convert the adjusted AC signal to a DC signal.

7. The converter module of claim 6 wherein the first DC source is adapted to provide a first voltage and the second DC source is adapted to provide a second voltage that is less than the first voltage.

8. The converter module of claim 6 wherein the processor is further programmed to facilitate current flow in both directions between the first DC source and the second DC source.

9. The converter module of claim 1 wherein the periodic waveform comprises a square waveform.

10. The converter module of claim 1 further comprising a snubber circuit arranged in parallel with one of the at least two first switches.

11. A converter module comprising:
a first power delivery circuit to supply positive direct current (DC) voltage from a first DC source to a resonant stage, the first power delivery circuit comprising at least two first switches;
a second power delivery circuit to supply negative DC voltage to the resonant stage, the second power delivery circuit comprising at least two second switches; and
a controller including memory, and a processor programmed to:
enable the first power delivery circuit and the second power delivery circuit alternately to provide power as a periodic waveform to the resonant stage; and
disable the at least two first switches individually in a sequence to generate a falling phase shift in the periodic waveform and to disable the first power delivery circuit.

12. The converter module of claim 11, wherein the falling phase shift of the periodic waveform comprises a substantially constant voltage segment between two falling edge portions extending between a maximum voltage and a minimum voltage of the periodic waveform.

13. The converter module of claim 12, wherein the substantially constant voltage segment is approximately equal to zero volts.

14. The converter module of claim 11, wherein the controller is further programmed to:
enable the second power delivery circuit to supply the negative DC voltage to the resonant stage; and
disable the at least two second switches individually to generate a rising phase shift between two rising edge portions of the periodic waveform and to disable the second power delivery circuit.

15. The converter module of claim 11 further comprising a snubber circuit arranged in parallel with one of the at least two first switches.

16. The converter module of claim 11 wherein the resonant stage converts the periodic waveform to an alternating current (AC) signal, the converter module further comprising:
a transformer coupled to the resonant stage to adjust an amplitude of the AC signal; and
a rectifier coupled between the transformer and a second DC source to convert the adjusted AC signal to a DC signal.

17. The converter module of claim 16 wherein the first DC source is adapted to provide a first voltage and the second DC source is adapted to provide a second voltage that is less than the first voltage.

18. The converter module of claim 16 wherein the processor is further programmed to facilitate current flow in at least one direction between the first DC source and the second DC source.

19. A method for generating a periodic waveform with a phase-shift, comprising:
disabling a first power delivery circuit, coupled between a direct current (DC) source and a resonant stage, from supplying positive voltage to the resonant stage;
enabling a second power delivery circuit to supply negative voltage to the resonant stage;
disabling a first switch of the second power delivery circuit; and
after a predetermined period of time, disabling a second switch of the second power delivery circuit to generate a substantially constant voltage segment between two rising edge portions of the periodic waveform.

20. The method of claim 19, further comprising:
enabling the first power delivery circuit to supply positive voltage to the resonant stage; and
disabling at least two first switches of the first power delivery circuit individually to generate a falling phase shift in the periodic waveform and to disable the first power delivery circuit.

* * * * *